(12) United States Patent
Lee

(10) Patent No.: US 9,108,664 B2
(45) Date of Patent: Aug. 18, 2015

(54) CONTROL APPARATUS OF VEHICLE FOR CHANGING LANE AND CONTROL METHOD OF THE SAME

(71) Applicant: Hyundai Mobis Co., Ltd., Seoul (KR)

(72) Inventor: Jeong Hee Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 68 days.

(21) Appl. No.: 13/793,257

(22) Filed: Mar. 11, 2013

(65) Prior Publication Data

US 2014/0129084 A1    May 8, 2014

(30) Foreign Application Priority Data

Nov. 6, 2012   (KR) ................. 10-2012-0125041

(51) Int. Cl.
  *B62D 6/00* (2006.01)
  *G08G 1/16* (2006.01)
  *B62D 15/02* (2006.01)

(52) U.S. Cl.
  CPC .............. *B62D 6/00* (2013.01); *B62D 15/0255* (2013.01); *G08G 1/167* (2013.01)

(58) Field of Classification Search
  None
  See application file for complete search history.

(56) References Cited

U.S. PATENT DOCUMENTS

| | | | | |
|---|---|---|---|---|
| 6,092,619 | A * | 7/2000 | Nishikawa et al. | 180/446 |
| 8,170,739 | B2 * | 5/2012 | Lee | 701/25 |
| 8,688,327 | B2 * | 4/2014 | Limpibunterng et al. | 701/42 |
| 2006/0217860 | A1 | 9/2006 | Ihara | |
| 2009/0299573 | A1 | 12/2009 | Thrun et al. | |

FOREIGN PATENT DOCUMENTS

| | | |
|---|---|---|
| DE | 10 2006 000 638 A1 | 7/2007 |
| DE | 10 2008 060 770 A1 | 9/2009 |
| JP | 10-105232 A | 4/1998 |
| JP | 2003-063273 A | 3/2003 |
| JP | 2008-149855 A | 7/2008 |
| JP | 2009-040267 A | 2/2009 |
| JP | 2010-092416 A | 4/2010 |
| JP | 2011-255857 A | 12/2011 |

(Continued)

OTHER PUBLICATIONS

Extended European Search Report mailed Feb. 6, 2014 in counterpart European patent application No. 13152250.0 (5 pages, in English).

(Continued)

*Primary Examiner* — Thomas G Black
*Assistant Examiner* — Ana Thomas
(74) *Attorney, Agent, or Firm* — NSIP Law

(57) ABSTRACT

A control apparatus of a vehicle for changing a lane is provided that includes a target lane generator configured to generate a target lane; a target distance generator configured to generate a target distance; a circular trace generator configured to generate a circular trace passing a current point of a vehicle and a point on a center line of the target lane spaced by the target distance based on the vehicle, and having a driving direction of the vehicle as a tangential direction in real time; and a steering controller configured to calculate a target rate and a target steering angle so as for the vehicle to follow the generated circular trace. The control apparatus prevents a sense of steering difference and a pulling phenomenon of the vehicle when changing a lane. Also, a control method of a vehicle for changing a lane is provided.

12 Claims, 4 Drawing Sheets

(56) References Cited

FOREIGN PATENT DOCUMENTS

| KR | 10-2010-0005362 A | 1/2010 |
| KR | 10-2010-0027565 A | 3/2010 |
| KR | 10-2011-0032707 A | 3/2011 |
| KR | 10-2011-0104681 A | 9/2011 |

OTHER PUBLICATIONS

Korean Office Action mailed Dec. 15, 2013 in counterpart Korean Patent Application No. 10-2012-0125041 (5 pages, in Korean).
Japanese Office Action mailed Nov. 12, 2013 in counterpart Japanese Patent Application No. 2013-007249 (3 pages, in Japanese).

* cited by examiner

CONTROL APPARATUS OF VEHICLE FOR CHANGING LANE AND CONTROL METHOD OF THE SAME

CROSS-REFERENCE TO RELATED APPLICATIONS

This application claims priority to and the benefit of Korean Patent Application No. 10-2012-0125041 filed in the Korean Intellectual Property Office on Nov. 6, 2012, the entire contents of which are incorporated herein by reference.

TECHNICAL FIELD

The present invention relates to a control apparatus of a vehicle for changing a lane, and a control method of the same, and more particularly, to a control apparatus of a vehicle for changing a lane, which controls so that a vehicle automatically changes a lane based on road information obtained from a camera and driving information obtained from various sensors, and a control method of the same.

BACKGROUND ART

In a control system of an intelligent vehicle, a lane keeping assist system (hereinafter, referred to as an "LKAS") is an essential system used for safety of a driver. The LKAS is generally configured so as to perform lane keeping control so as to prevent a vehicle from departing from a detected lane or warn lane departure by detecting the lane and sensing a driving state of the vehicle.

The road information including a lane may be detected by obtaining a front road image through a camera sensor mounted between a windshield and a room mirror of a vehicle and image-processing the obtained road image in an LKAS camera system. The driving information may be sensed through information obtained from various sensors and an electronic control unit (ECU) mounted in the vehicle.

In the meantime, a system for giving a driver a warning according to existence or nonexistence of a rear vehicle and a driving state when an intention of a driver for changing a lane is sensed in the LKAS has been suggested. In addition to the aforementioned system, a lane changing system for automatically changing a lane to a target lane by utilizing road information of a camera system has been suggested. In general, the lane changing system performs control for changing a lane by utilizing a spaced distance between a virtual lane for inducing a vehicle to a target lane and the vehicle. However, since the lane changing system performs the control by reflecting only the spaced distance between the virtual lane and the vehicle, there is a problem in that steering is unsafe due to a sense of steering difference and a pulling phenomenon of a vehicle.

SUMMARY OF THE INVENTION

The present invention has been made in an effort to provide a control apparatus of a vehicle for changing a lane, which is capable of preventing a sense of steering difference and a pulling phenomenon of a vehicle, and a control method of the same.

An exemplary embodiment of the present invention provides a control apparatus of a vehicle for changing a lane, including: a target lane generator configured to generate a target lane; a target distance generator configured to generate a target distance; a circular trace generator configured to generate a circular trace passing a current point of a vehicle and a point on a center line of the target lane spaced by the target distance based on the vehicle, and having a driving direction of the vehicle as a tangential direction in real time; and a steering controller configured to calculate a target rate and a target steering angle so as for the vehicle to follow the generated circular trace.

The target lane generator may generate a virtual target lane by shifting to a predetermined direction by a width of a current driving lane.

The target distance generator may calculate the target distance based on a speed of the vehicle, and a traverse directional departure distance of the vehicle from the center line of the target lane.

The steering controller may calculate the target rate based on a departure distance of the vehicle from the center line of the target lane, a departure angle between the center line of the target lane and the vehicle, an amount of side slip of the vehicle, and a speed of the vehicle.

The steering controller may calculate the target steering angle based on the target rate.

Another exemplary embodiment of the present invention provides a control method of a vehicle for changing a lane, including: a) generating a target lane; b) generating a target distance; c) generating a circular trace passing a current point of a vehicle and a point on a center line of the target lane spaced by the target distance based on the vehicle, and having a driving direction of the vehicle as a tangential direction in real time; and d) calculating a target rate and a target steering angle so as for the vehicle to follow the generated circular trace.

In step a), a virtual target lane may be generated by shifting to a predetermined direction by a width of a current driving lane.

In step b), the target distance may be calculated based on a speed of the vehicle, and a traverse directional departure distance of the vehicle from the center line of the target lane.

In step d), the target rate may be calculated based on a departure distance of the vehicle from the center line of the target lane, a departure angle between the center line of the target lane and the vehicle, an amount of side slip of the vehicle, and a speed of the vehicle.

In step d), the target steering angle may be calculated based on the target rate.

Accordingly to the control apparatus of the vehicle for changing the lane and the control method of the same according to the present invention, it is possible to prevent a sense of steering difference and a pulling phenomenon of the vehicle when changing a lane by controlling to change the lane based on the target distance that is changed in real time in response to a speed of the vehicle and the traverse directional departure distance from the center line of the target lane.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
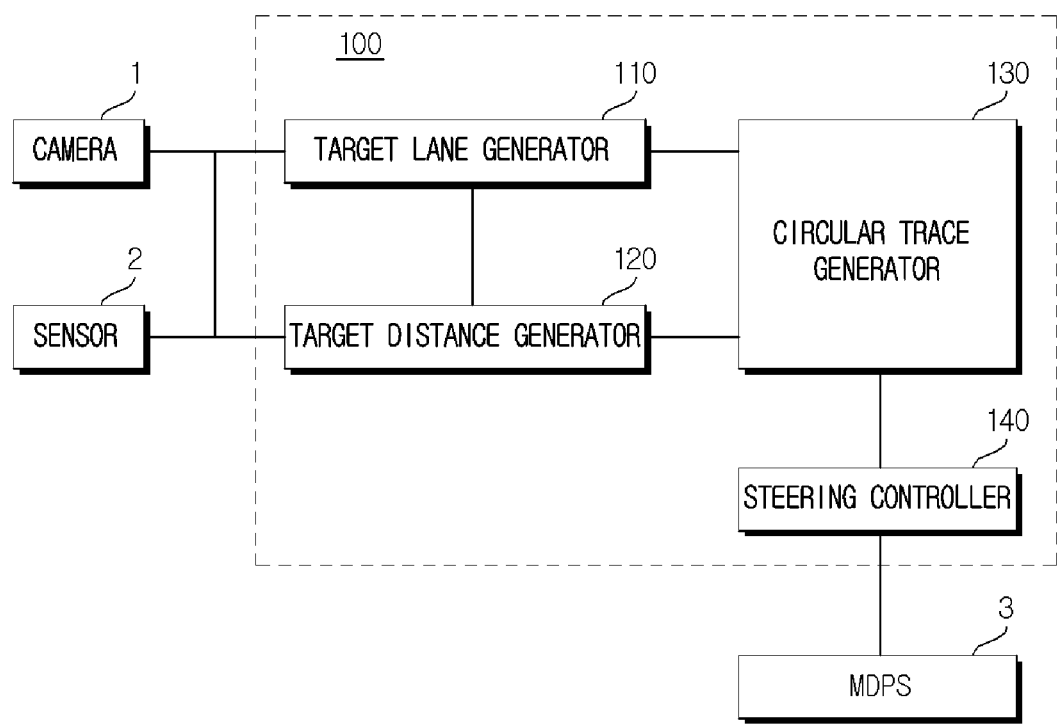
FIG. 1 is a block diagram illustrating a control apparatus of a vehicle for changing a lane according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an exemplary embodiment of the present invention will be described in detail with reference to the accompanying drawings. First of all, we should note that in giving reference numerals to elements of each drawing, like reference numerals refer to like elements even though like elements are shown in different drawings. It should be understood that although the exemplary embodiment of the present invention are described hereafter, the spirit of the present invention is not limited thereto and may be changed and modified in various ways by those skilled in the art.

The present invention is based on a lane changing control apparatus for automatically changing a lane, and has a technical characteristic of controlling steering of a vehicle in real time based on a target distance and a circular trace, which are changed in real time, during a change of a lane.

FIG. 1 is a block diagram illustrating a control apparatus of a vehicle for changing a lane according to an exemplary embodiment of the present invention. Referring to FIG. 1, a control apparatus 100 of the vehicle for changing the lane according to the exemplary embodiment of the present invention includes a target lane generator 110, a target distance generator 120, a circular trace generator 130, and a steering controller 140.

First, the target lane generator 110 generates a target lane in a predetermined direction when a lane changing intention of a driver is sensed or it is necessary to change a lane according to a route planner. In the exemplary embodiment, the target lane generator 110 may generate a virtual target lane by shifting in a predetermined direction by a width of a current driving lane.

Figure 2:
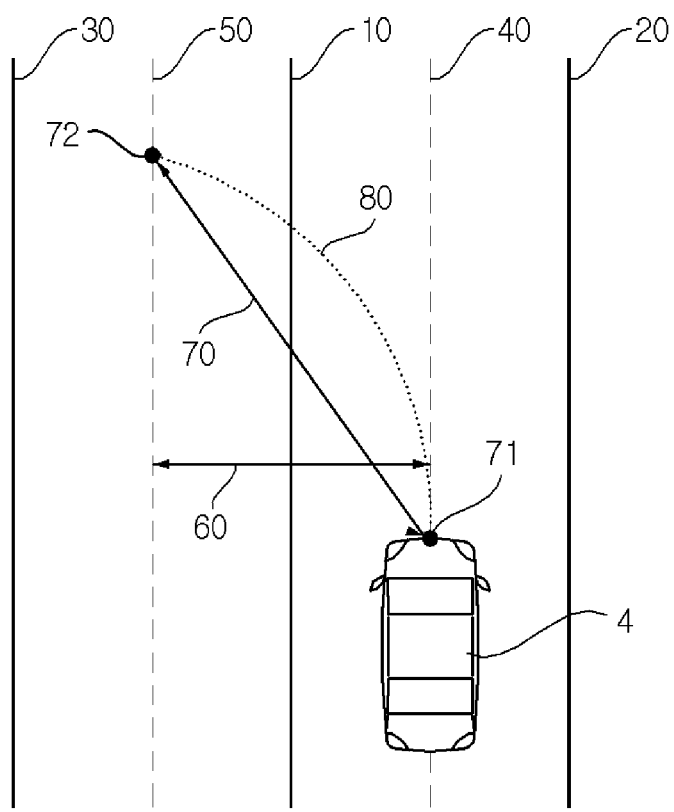
FIG. 2 is a view illustrating a target distance and a circular trace in a current driving lane.
Figure 3:
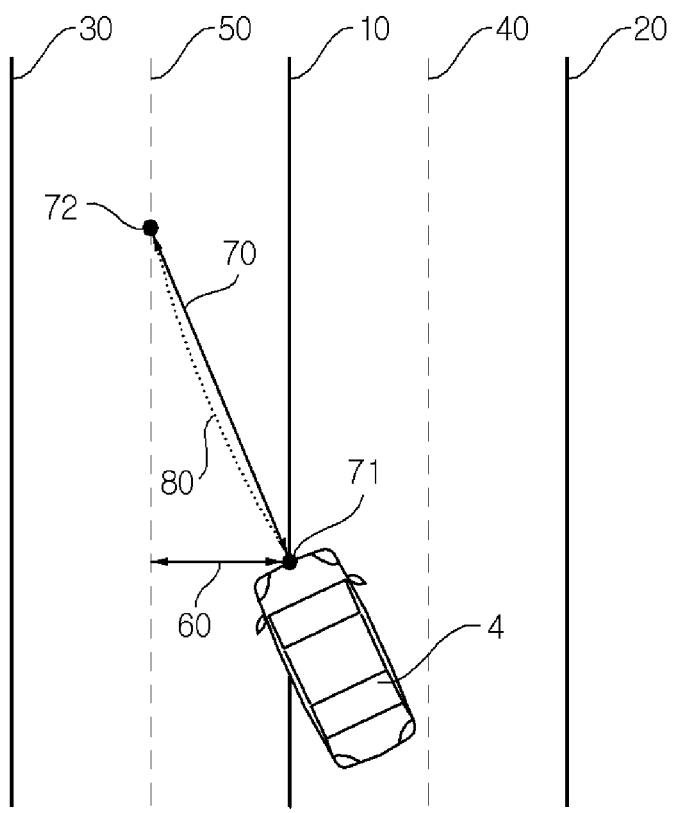
FIG. 3 is a view illustrating a target distance and a circular trace, which are changed in real time, during a change of a lane.

FIG. 2 is a view illustrating a target distance and a circular trace in a current driving lane, and FIG. 3 is a view illustrating a target distance and a circular trace, which are changed in real time, during a change of a lane.

Referring to FIG. 2, when an intention of a driver for changing a lane to a left side of FIG. 2 is sensed or a lane change is determined according to a route planner from current driving lanes 10 and 20, the target lane generator 110 generates a virtual target lane 30 by shifting to a left side by a width of the current driving lanes 10 and 20. Information on the current driving lanes 10 and 20 may be detected by a camera system and a lane detection module installed in a vehicle 4.

The current vehicle 4 of FIG. 2 is in a state of keeping a front driving based on a center lane 40 of the current driving lanes 10 and 20.

The target distance generator 120 generates a target distance 70 that is a distance from the vehicle 4 to a predetermined target keeping point 72. In order to change the lane, the target distance generator 120 needs to generate a target distance longer than that of a lane keeping assist system (hereinafter, referred to as an "LKAS"). This is because a larger traverse directional departure distance 60 between the center lane 50 of the target lane and the vehicle 4 is generated when changing a lane as compared to a case where the lane is kept, so that a radius of a circular trace is decreased and thus a pulling phenomenon becomes severe according to an increase in a target rate. Accordingly, the target distance generator 120 calculates the target distance 70 by multiplying the target distance used in the LKAS by a degree of influence (gain*traverse directional departure distance+1). Here, the target distance used in the LKAS may be calculated by reflecting a speed of the vehicle and a curvature of a road. The speed of the vehicle may be obtained from a sensor 2, and the curvature of the road may be detected by the camera system and the lane detection module installed in the vehicle 4.

Since the target distance 70 has the traverse directional departure distance 60 as a variable, the target distance 70 is also changed in response to the traverse directional departure distance 60 that is changed in real time during the change of the lane by the corresponding vehicle 4. Referring to FIG. 3, it can be seen that when the vehicle 4 is changing the lane, the traverse directional departure distance 60 is smaller than the traverse directional departure distance 60 illustrated in FIG. 2. Accordingly, the target distance 70 is large at an initial stage of the lane change, but the target distance 70 is decreased as the lane change progresses. When the lane change is completed, the traverse directional departure distance 60 becomes 0, so that the existing target distance used in the LKAS is used. Since the target distance 70 is changed in real time according to a process of the lane change as described above, it is possible to minimize a sense of steering difference and a pulling phenomenon of a vehicle.

The circular trace generator 130 generates a circular trace passing a current point of the vehicle 4 and a point on the center line of the target lane spaced by the target distance based on the vehicle 4 and having a driving direction of the vehicle as a tangential direction in real time. In the exemplary embodiment, a circular trace 80 passing a center 71 of a front end of the vehicle 4 and a point 72 on the target lane may be generated. When changing a lane, it is possible to minimize a sense of steering difference and a pulling phenomenon by controlling the vehicle 4 so as to keep the circular trace 80 generated in real time as described above.

The steering controller 140 calculates a target rate and a target steering angle so as to keep the circular trace 80 that is generated in real time. The steering controller 140 may first calculate the target rate based on the traverse directional departure distance 60, a departure angle between the center line 50 of the target lane and the vehicle 4, an amount of side slip of the vehicle 4, and a speed of the vehicle. The steering controller 140 calculates the target steering angle based on the calculated target rate. The steering controller 140 induces the corresponding vehicle 4 to be steered at the target steering angle by transmitting the calculated target steering angle to a motor driven power steering (MDPS) 3.

Figure 4:
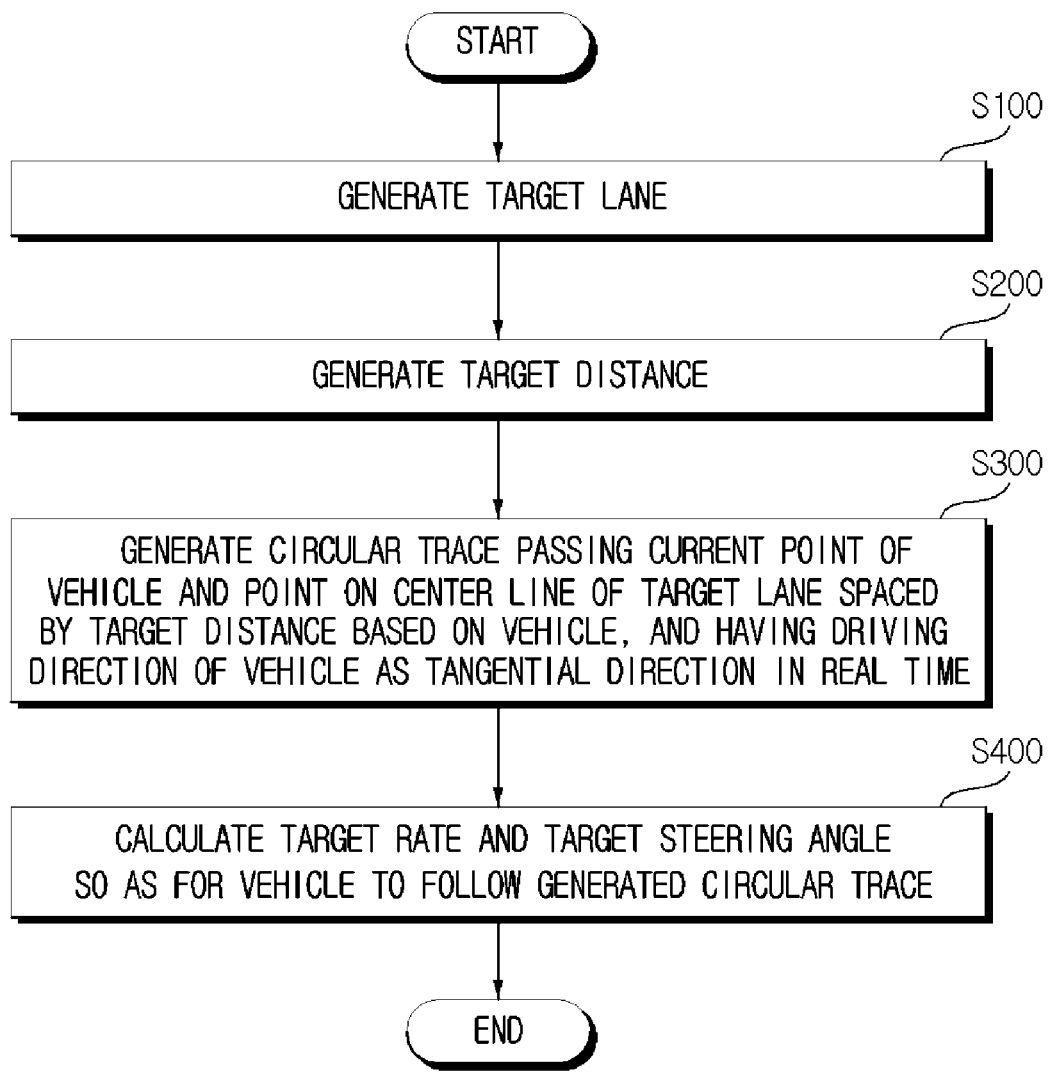
FIG. 4 is a flowchart illustrating a control method of a vehicle for changing a lane according to an exemplary embodiment of the present invention.

FIG. 4 is a flowchart illustrating a control method of a vehicle for changing a lane according to an exemplary embodiment of the present invention.

Referring to FIG. 4, in the control method of the vehicle for changing the lane according to the exemplary embodiment of the present invention, the target lane generator 110 first generates a target lane in a predetermined direction when an intention of a driver for changing a lane is sensed or it is necessary to change a lane according to a route planner (S100). Next, the target distance generator 120 generates the target distance 70 that is a distance from the vehicle 4 to the predetermined target keeping point 72 (S200). Subsequently, the circular trace generator 130 generates a circular trace passing a current point of the vehicle 4 and a point on the center line of the target lane spaced by the target distance based on the vehicle 4, and having a driving direction of the vehicle as a tangential direction in real time (S300). Next, the steering controller 140 calculates a target rate and a target steering angle so as to keep the circular trace 80 that is generated in real time (S400).

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A control apparatus of a vehicle for changing a lane, comprising:
   a target lane generator configured to generate a target lane;
   a target distance generator configured to generate a target distance;
   a circular trace generator configured to generate, in real time, a circular trace (i) passing through a current point of a vehicle and a point on a center line of the target lane spaced by the target distance based on the vehicle, and (ii) having a driving direction of the vehicle as a tangential direction; and
   a steering controller configured to calculate a target rate and a target steering angle so as for the vehicle to follow the generated circular trace.

2. The control apparatus of claim 1, wherein the target lane generator generates a virtual target lane by shifting to a predetermined direction by a width of a current driving lane.

3. The control apparatus of claim 1, wherein the target distance generator calculates the target distance based on a speed of the vehicle, and a traverse directional departure distance of the vehicle from the center line of the target lane.

4. The control apparatus of claim 1, wherein the steering controller calculates the target rate based on a departure distance of the vehicle from the center line of the target lane, a departure angle between the center line of the target lane and the vehicle, an amount of side slip of the vehicle, and a speed of the vehicle.

5. The control apparatus of claim 4, wherein the steering controller calculates the target steering angle based on the target rate.

6. The control apparatus of claim 1, wherein the target distance generator is configured to generate in real time an adjusted target distance during a same lane change procedure, the circular trace generator is configured to generate in real time a corresponding adjusted circular trace, and the steering controller is configured to calculate in real time a corresponding adjusted target rate and a corresponding adjusted target steering angle so as for the vehicle to follow the generated corresponding adjusted circular trace.

7. A control method of a vehicle for changing a lane, comprising:
   a) generating a target lane;
   b) generating a target distance;
   c) generating, up to a center line of the target lane in real time, a circular trace passing through a current point of a vehicle and a point on the center line of the target lane spaced by the target distance based on the vehicle, and having a driving direction of the vehicle as a tangential direction; and
   d) calculating a target rate and a target steering angle so as for the vehicle to follow the generated circular trace,
   wherein steps a)-d) are performed by an electronic control unit (ECU).

8. The control method of claim 7, wherein in step a), a virtual target lane is generated by shifting to a predetermined direction by a width of a current driving lane.

9. The control method of claim 8, wherein in step b), the target distance is calculated based on a speed of the vehicle, and a traverse directional departure distance of the vehicle from the center line of the target lane.

10. The control method of claim 9, wherein in step d), the target rate is calculated based on a departure distance of the vehicle from the center line of the target lane, a departure angle between the center line of the target lane and the vehicle, an amount of side slip of the vehicle, and a speed of the vehicle.

11. The control method of claim 10, wherein in step d), the target steering angle is calculated based on the target rate.

12. The control method of claim 7, further comprising
   e) generating in real time an adjusted target distance during a same lane change procedure,
   f) generating in real time a corresponding adjusted circular trace, and
   g) calculating in real time a corresponding adjusted target rate and a corresponding adjusted target steering angle so as for the vehicle to follow the generated corresponding adjusted circular trace.

* * * * *